UNITED STATES PATENT OFFICE.

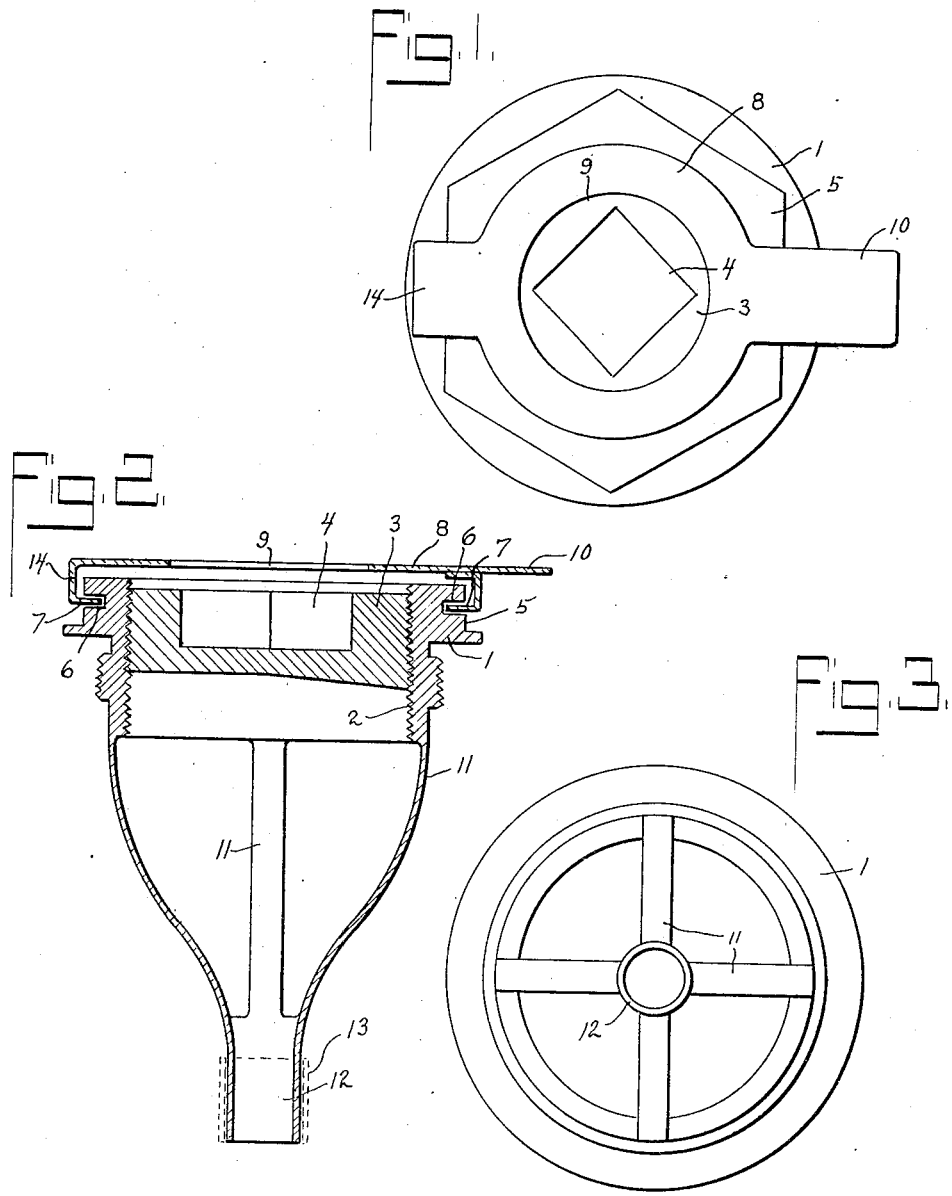

LEON N. BOURDEAU, OF ROCK ISLAND, ILLINOIS, ASSIGNOR OF ONE-HALF TO JOHN G. SORENSON, OF DAVENPORT, IOWA.

GREASE-CUP.

1,337,432.  Specification of Letters Patent.  Patented Apr. 20, 1920.

Application filed February 7, 1919. Serial No. 275,484.

*To all whom it may concern:*

Be it known that I, LEON N. BOURDEAU, a citizen of the United States, residing at Rock Island, in the county of Rock Island and State of Illinois, have invented certain new and useful Improvements in Grease-Cups, of which the following is a specification.

My invention has reference to grease cups, of that kind which are commonly carried on the connecting rod of a locomotive, for the purpose of holding lubricants for the bearings at the ends thereof. A common form of these devices comprises a bushing adapted to be seated in an opening in the connecting rod, and provided with a plug or follower, movable therein. On account of the vibration incident to the movement of the engine, these plugs frequently work out of the bushing, and are lost. The principal purpose of my invention is to prevent such loss, without interfering with the customary operation of the plug, to adjust the same in the bushing.

I also provide an extension for the bushing having a feed-tube at its lower end which separates the brasses in the end of the connecting rod, and aids in preventing wear thereof.

In the drawings:—

Figure 1 is a plan view of my invention. Fig. 2 is a vertical medial section thereof. Fig. 3 is a lower end view thereof.

1 represents a bushing, having an external thread for engagement with a similar thread in the part in which the bushing is designed to be seated. Said bushing is also provided with an internal thread 2 for engagement with the threads on a plug 3, in the outer face of which is an opening 4, for the application of a tool in turning the plug 3, to move it deeper into the bushing, or remove the same, as desired. The upper part of the bushing is formed into a wrench head 5, two of the edges of which are provided with recesses 6, adapted to receive the ends 7 of a plate 8, having a central opening 9. The plate 8 is formed of spring metal, and after one of the ends 7 is positioned in one of the recesses 6 the other end can be easily sprung into place in the opposite recess. This operation is made easier by means of a projection 10, and by means of such projection, or handle, the plate can be readily detached, when desired.

It will be seen that when the plate 8 is in position, it will prevent any removal of the plug 3, accidentally or otherwise, and at the same time the opening 9 in such plate will permit access to the plug, to turn the same with a tool, in the usual manner. Such plug is turned inwardly when it is desired to force the oil downwardly, into the wearing parts of the connecting-rod.

The bushing 1 is provided with an extension, consisting of strips 11, ending in a tube 12, which is designed to be positioned between the connecting-rod brasses, when the bushing is in place, and direct the lubricant thereto. It also tends to hold such brasses apart, as the same become worn around the crank-pin, so that the oiling operation will not be interfered with. In case there is some wear about the tube 12, this can be adjusted by seating thereon a sleeve, as shown in broken lines at 13, giving additional thickness to the tube.

The end 14 of the plate 8 is of such a shape, that for emergency purposes it can be inserted in the opening 4 of the plug, to adjust the position thereof.

What I claim and desire to secure, is:

1. In combination with a grease-cup bushing, provided in its head with a pair of oppositely disposed recesses, and a plug adjustably held in said bushing, and provided in its outer face with a tool-engaging means; of a resilient plate having a central opening, and provided with extensions adapted for engagement with said recesses, to hold said plate in position.

2. In combination with a grease-cup bushing, provided with catch-engaging means on opposite sides of its head, and a plug adjustably held in said bushing, and provided on its outer face with tool-engaging means; a spring plate provided with a central opening permitting access to said plug; catches on the ends of said plate adapted to coöperate with said catch-engaging means, to hold said plate removably in position on said bushing; and a handle on said plate for the operation thereof.

3. In combination with a grease-cup bushing, provided with catch-engaging means on opposite sides of its head, and a plug adjustably held in said bushing, and provided on its outer face with tool-engaging means; a spring-controlled flexible plate provided with a central opening permitting access to said plug; catches on the ends of said plate adapted to coöperate with said catch-engaging means, to hold said plate removably in position on said bushing; and a handle on said plate for the operation thereof.

In testimony whereof I affix my signature.

LEON N. BOURDEAU.